J. S. SNIDER.
Seed Planter.
No. 24,959. Patented Aug. 2, 1859.
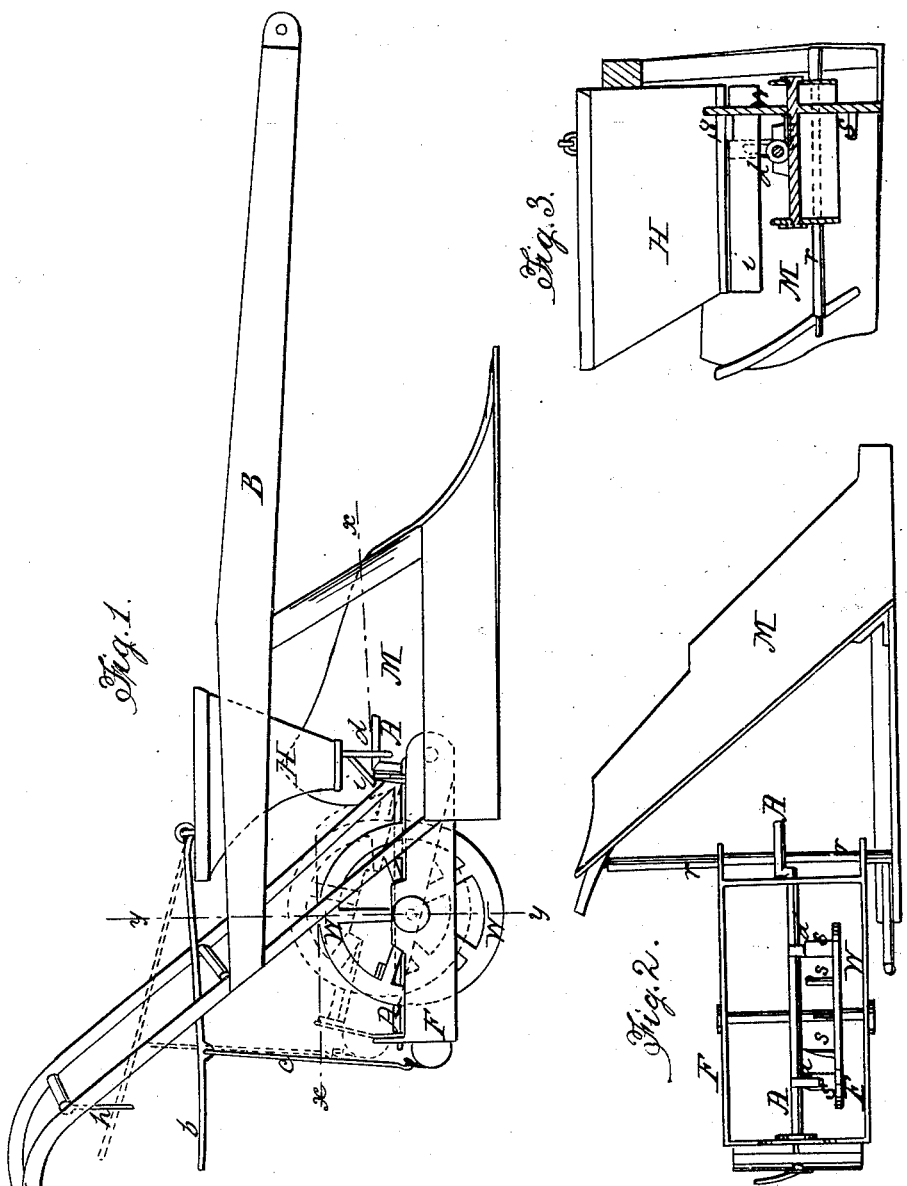

UNITED STATES PATENT OFFICE.

JOHN S. SNIDER, OF LANCASTER, OHIO.

IMPROVEMENT IN SEEDING-PLOWS.

Specification forming part of Letters Patent No. 24,959, dated August 2, 1859.

*To all whom it may concern:*

Be it known that I, JOHN S. SNIDER, of Lancaster, in the county of Fairfield and State of Ohio, have invented a new and useful Improvement in Seeding-Machines; and I do hereby declare that the following is a full, clear, and exact description of the same, reference being had to the annexed drawings, forming part of this specification, in the several figures of which similar characters of reference denote the same part.

Figure 1 is a side view of my improved seeding-machine. Fig. 2 is horizontal section on line $x\,x$. Fig. 3 is a cross-section on line $y\,y$.

The nature of my invention consists of an ordinary plow having a seed-hopper with discharge-openings and slide at the bottom of it; also a rod from the landside of the plow to the mold-board, on which is hung a swinging frame containing a longitudinal crank-shaft, the crank of which is inserted into the slot of the arm of the discharge-slide, and having arms $a\,a'$. The frame also contains a wheel, W, with studs $s$, which, as the wheel rotates, catch against the arms $a\,a'$ of the shaft, and, rocking it, shakes the discharge-slide, with which it is connected by the crank in the slot, and thus scatters the seed, there being also a small inclined board attached to the discharge-slide, which assists in scattering the seed. In turning the plow the swinging frame may be raised from the ground by means of the chain connecting it with the rod fastened to the top of the hopper, which rod can be caught in the hook $h$ on the handle of the plow, thus raising the frame and wheel out of the way.

In the drawings, B is the beam of the plow. M is the mold-board; H, the seed-hopper, having discharge-openings and slide in the bottom of it. $r$ is the rod from the landside to the mold-board, on which is hung the swinging frame F, containing wheel W, with its studs $s$ and longitudinal crank-shaft A, the crank being inserted in the slot $d$ of the discharge-slide, said shaft having arms $a\,a'$; and $i$ is the inclined board, attached to the discharge-slide under the openings, which aids in scattering the seed. $c$ is the chain connecting the frame F with the rod $b$, which caught on hook $h$ for the purpose of raising the frame from the ground while turning the plow, so that the wheel turning on the ground the studs $s$ catch against the arm $a\,a'$ of the shaft, and rocking it moves the discharge-slide to and fro, and the seed, falling on the inclined board $i$, is scattered into the furrow, and in the next round of the plow the mold-board throws the fertilizer over and covers up the seed, and in turning the plow, by catching the rod $b$ on the hook $h$, the frame and wheel are lifted entirely from the ground and out of the way, as shown by the red drawing in Fig. 1.

What I claim, and desire to secure by Letters Patent, is—

The arrangement of the swinging frame F, wheel W, crank-shaft A, with the hopper H, and mold-board M, together with the devices connecting said parts, so as to operate as herein set forth.

In testimony whereof I have hereunto signed my name before two subscribing witnesses.

JOHN S. SNIDER.

Witnesses:
 GEO. PATTEN,
 JOHN S. HOLLINGSHEAD.